June 29, 1965  R. A. HALEY  3,191,590
AUTOMATIC COOKING APPARATUS
Filed Sept. 19, 1961  2 Sheets-Sheet 1
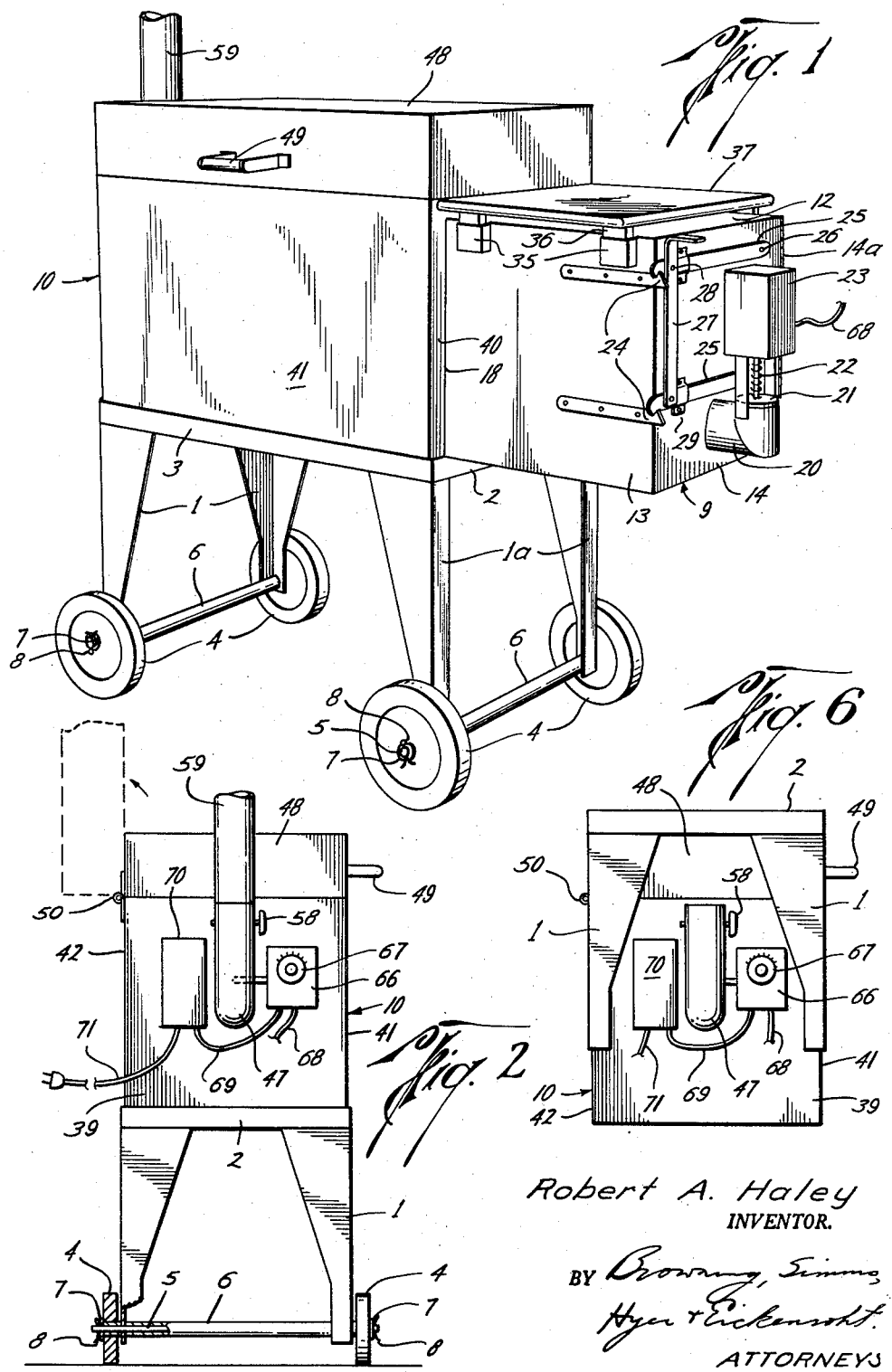
Robert A. Haley
INVENTOR.
BY Browning, Simms,
Hyer & Eickenroht
ATTORNEYS June 29, 1965  R. A. HALEY  3,191,590
AUTOMATIC COOKING APPARATUS
Filed Sept. 19, 1961  2 Sheets-Sheet 2
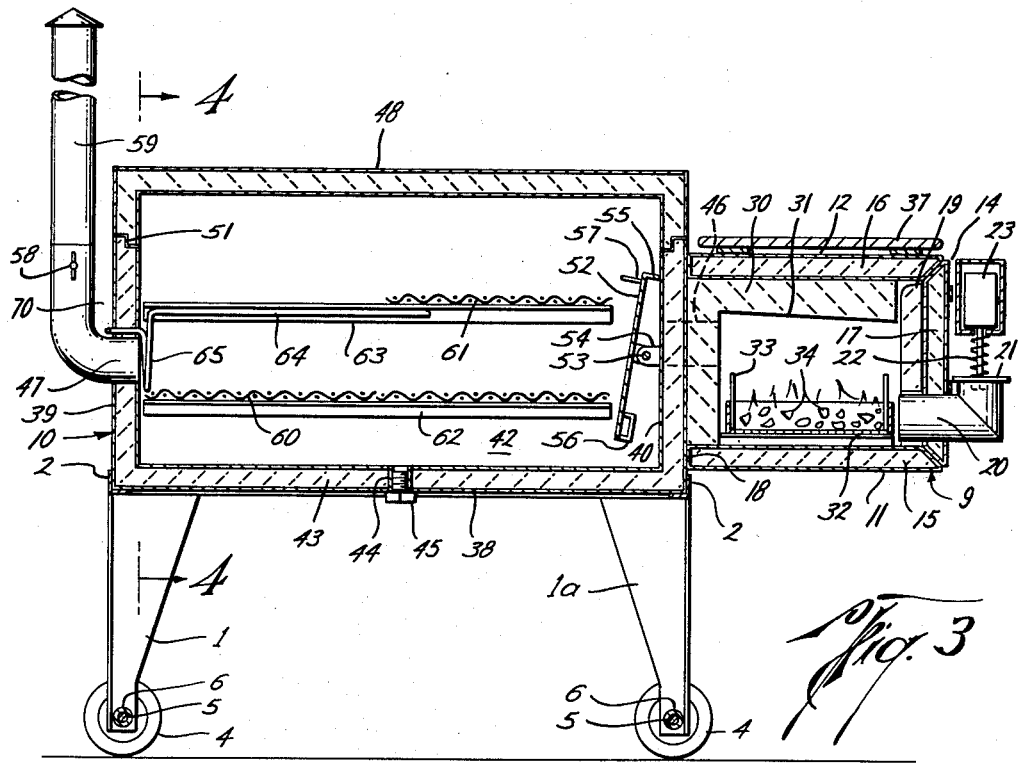
Fig. 3
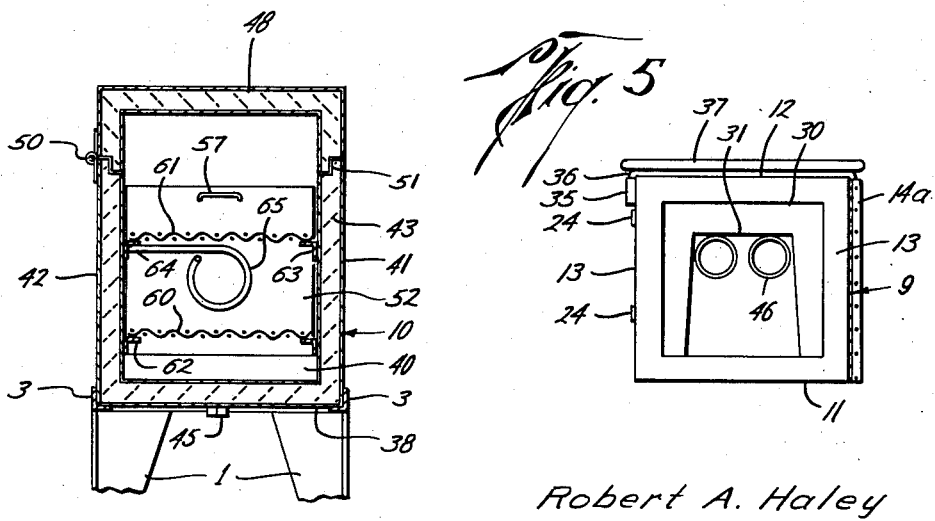
Fig. 4
Fig. 5
Robert A. Haley
INVENTOR.
BY
ATTORNEYS

3,191,590
AUTOMATIC COOKING APPARATUS
Robert A. Haley, P.O. Box 1233, Kilgore, Tex.
Filed Sept. 19, 1961, Ser. No. 139,260
1 Claim. (Cl. 126—19)

This invention relates to cooking apparatus and has for its general object the provision of a cooking apparatus fired by wood, charcoal or other suitable fuel which will offer greater all-around convenience and will be more foolproof in operation than cooking apparatuses for the same general purpose in the past.

While some of the features of this invention are applicable to other types of cooking apparatus, they are all especially applicable to that type of cooking apparatus commonly referred to as a "barbecue pit," in which the food is cooked by subjecting it to the action of smoke and gas resulting from the combustion of wood, charcoal or the like. A number of problems commonly existing in previously produced apparatus for this type of operation are solved by the present invention.

One of the most difficult problems with the ordinary type of cooking apparatus of this character is that of maintaining a substantially constant predetermined temperature in the cooking zone. Previous attempts along this line have employed thermostatically controlled dampers in the passageway leading from the combustion zone where the fuel is burned into the cooking zone. However, when such a damper closes, it inevitably causes smoke to be emitted from the fire in some other direction and is undesirable for that reason; and in addition, it tends to direct the heat from the fire box into one portion of the cooking zone or chamber more than into others. Additionally, the location of the thermostat in such devices has been such that it is subjected to almost direct action of the hot gases coming from the fire and for this reason must be set to stay open under much higher temperature conditions than desired throughout the cooking zone, and all in all does not provide a stable temperature regulation for the cooking zone. Furthermore, in very few of the prior art devices is an attempt made to distribute the hot gases entering the cooking zone in a controlled fashion with the possibility of adjusting the same to the particular cooking problem involved.

The result of the foregoing and other related shortcomings of prior devices has been that they have required close and constant attention during operation and a very high degree of skill in order to maintain the desired temperature with reasonable constancy during the cooking operation.

Another problem existing in prior devices has been that of safety during periods of little or no attention being paid to the device, so that the food being cooked will not become overdone and so that there will be no danger of fire or the like.

Accordingly, this invention has for one of its objects the provision of a cooking apparatus of the type mentioned in which a substantially constant temperature may be maintained automatically at a predetermined value without necessity for constant attention to the apparatus.

Another object of the invention is to provide such an apparatus in which the hot gases which provide the cooking atmosphere may be distributed in predetermined fashion throughout the cooking zone so as to place the hottest of such gases in the location desired for them and maintaining the temperature pattern in the entire zone in a manner best suited to the particular cooking problem in hand.

Another object of this invention is to control the heat supply to the cooking zone of such an apparatus without causing smoking or other difficulty in other parts of the apparatus.

Another object of this invention is to provide an automatic regulation of the temperature within the cooking zone involving the sensing of the temperature at critical points in the cooking zone.

Another object of this invention is to provide a cooking apparatus of the character herein described in which any failure of the temperature regulating mechanism will automatically shut off the supply of hot gases to the cooking zone and thereby avoid the danger of overcooking or burning food in such zone.

Another object of this invention is to provide a temperature regulating apparatus in which any failure of the regulating mechanism will shut off the supply of air to the fuel and hence provide a "fail-safe" arrangement.

Another object of this invention is to provide a cooking apparatus with a support and means for readily moving it from place to place while in position for use, which support may be nested with the apparatus for storage or shipment purposes so that it will take up a minimum of space and actually occupy substantially no more volume than the cooking apparatus without the supporting members.

Other objects and advantages of this invention will become apparent from the following description taken in connection with the accompanying drawings in which like numerals are employed to designate corresponding parts throughout and in which there is illustrated a preferred embodiment of the invention.

In the drawings:

FIG. 1 is a perspective view of the cooking apparatus and support therefor constructed in accordance with this invention;

FIG. 2 is an end elevation of the same apparatus with parts broken away and shown in cross section for purposes of illustration;

FIG. 3 is a longitudinal vertical cross section through the apparatus shown in FIG. 1;

FIG. 4 is a partial sectional view taken along the line 4—4 of FIG. 3;

FIG. 5 is an end elevation of the fire box portion of the apparatus shown in FIG. 3 with the door of the fire box removed in order to show the interior more clearly; and FIG. 6 is an end elevation of the same apparatus taken from the end opposite the fire box and showing the apparatus removed from its support and the support nested therewith in condition for storage or shipment.

Generally, the objects of this invention are accomplished by utilizing a construction minimizing the loss of heat from the apparatus by radiation and the like to the exterior, controlling the products of combustion so that they flow without escaping from the apparatus into the cooking portion of the apparatus and are there distributed in the manner most desired by means of an adjustable distributor vane, and controlling the supply of heat to the cooking zone thermostatically by means of a thermostatic control on the supply of combustion air to the fuel in the fire box. Such supply mechanism in the form illustrated is controlled from critical points in the cooking zone through the placement of temperature sensitive elements of a thermostat control at critical points such as just beneath one of the most used cooking locations and between the uppermost and lowermost of such locations, and also putting a part of the temperature sensitive device in position to be affected by the flow of gases from the cooking zone as distinguished from into the cooking zone. The mechanism for controlling the supply of combustion air is also biased in the form illustrated so that, upon failure of the thermostatic mechanism, the supply of combustion air would automatically be cut off. Means is also provided for shutting off the supply of combustion air after the passage of a predetermined amount of time.

A support provided for the cooking apparatus is of such a character that the wheels upon which it is mounted may readily be removed and the framework of the support nested with the cooking apparatus so as to occupy very little if any additional space more than that which would be occupied by the cooking apparatus alone, an arrangement which greatly facilitates storage and transportation. The removable wheels and associated parts are so sized that they may be stored within the cooking apparatus itself for purposes of such shipment or storage.

Referring now more in detail to the drawings, the support for the cooking apparatus is provided with legs 1 and 1a of suitable length secured at their upper ends to a continuous closed frame having end members 2 and side members 3, this frame being of substantially the same size as the bottom plan of the oven or cooking zone portion of the cooking apparatus. This frame is preferably made of angle members or shapes so as to provide an upstanding rim so sized as to receive and fit fairly closely around the lower outer margin of the oven portion of the cooking apparatus.

The legs 1 and 1a are likewise preferably formed of angle shapes and are welded or otherwise permanently secured at their upper ends to the corners of the frame with the sides of their angle forms in substantially the same planes with the adjacent portions of the upstanding rim above mentioned and with their corners coinciding with the extensions of the corners of the frame. Thus, the interiors of the sides of the angles of these legs define a space exactly similar in plan to that defined by the upstanding rim with the result that the legs will nest over and closely embrace the oven in the same manner that the rim receives the lower portion of the oven in the use of the apparatus.

Mounted on the lower ends of the legs 1 and 1a are wheels 4 carried on axles 5 which extend between each of the legs of a pair thereof at one end of the support and project beyond the outsides of such legs through suitable holes in the legs themselves. The spacing between the legs is preferably maintained under such circumstances by means of a tubular member 6 surrounding the shaft 5 and of a length such as to just fit between the legs through which the shaft 5 extends.

A wheel 4 is mounted on each outboard end of each shaft 5, as illustrated in FIGS. 1 and 2, and retained thereon by means such as washers 7 and cotter keys 8. With this construction, it will be seen that the wheels can be readily removed by first removing the cotter keys 8 and the washers 7, and that thereafter the axles 5 and the tubular spacers 6 may also be readily removed from the legs 1, making it possible for the entire support to be nested over the cooking apparatus in the manner illustrated in FIG. 6.

The cooking apparatus consists generally of a fire box 9 and an oven 10. The fire box 9 is composed of a bottom wall 11 and a top wall 12, side walls 13 and a door 14. The top and bottom and side walls are joined to each other in the usual fashion, and the door 14 is hinged to one of the side walls by a suitable hinge 14a. All of these are of a metal-clad insulated character, the exterior being of metal such as sheet metal or the like or some other thin sheet material that will readily stand the heat involved, and being hollow so as to receive insulating sheets or masses 15, 16 and 17, respectively, of any suitable fireproof insulating material. Of course, the fireproofness of the material is not an absolutely essential quality, but it is highly desirable. Those ends of the bottom, top and side walls opposite the door 14 are preferably secured to the outer wall of the oven at 18 by welding or any other suitable means.

In addition to the sheet metal shell and the interior insulation 17 of the door 14, the inner surface of this door is preferably lined with a refractory block or other member 19. The door is provided with an opening therethrough, and the refractory member 19 is provided with a notch in its lower end to permit the passage from the exterior of the door into the fire box of a conduit 20 for combustion air. This combustion air conduit 20 has its intake end, outside of the door, controlled by a valve member 21 which in the instance shown moves directly toward the open end of this conduit to close the same when seated thereagainst, and away from such open end to open the conduit and permit the entry of air. The valve element 21 is carried and guided for such movement upon a suitable stem, and in the instance illustrated the stem is surrounded by a spring 22 or the like providing bias for the valve element 21 so that in the absence of other influences the valve element will be moved to its closed position in contact with the end of conduit 20. It is intended that the valve element should be moved to its open position to permit the entry of combustion air by the energization of a solenoid 23 acting upon the stem on which the valve member 21 is carried. Thus, when the solenoid is energized, the valve member will be in open position permitting the entry of combustion air; and when for any reason the solenoid is not energized, the valve member will occupy its closed position and prevent the entry of combustion air.

The door on which the conduit 20 and solenoid 23 are carried swings upon the hinge 14a, previously mentioned, and is intended to be latched in closed position by a latch comprising the keepers 24 secured to the side wall 13 of the fire box opposite the hinge 14a, these keepers having notches adapted to be engaged by latch bolts 25 hingedly mounted by means of pivots 26 on the door itself. These latch bolts 25 are linked together near their free ends by an actuating bar 27 pivoted to the latch bolts 25 as shown at 28 so that both bolts may be actuated by the actuating bar 27 simultaneously, and this bar will serve to space them at all times so that they will both be engaged or both be disengaged with the keeper members 24. The latch bolts 25 are permitted a limited vertical swinging movement and yet held against the outer face of the door 14 by means of retaining straps 29 suitably secured to the door and embracing the bolts 25 adjacent to the points where they are pivotally connected to the actuating bar 27.

The fire box is also provided on its interior upper wall and side walls and is closed at its end opposite the door by means of a suitable refractory body 30 which may be formed in any desired fashion so as to protect the walls, door and top of the fire box from the high temperatures and radiant heat generated in the fire box.

It has been found that some leakage of smoke and the like will generally take place around the upper portion of the door 14 if the portion of the refractory lining the top of the fire box is made with a substantially level surface; but that if this surface is inclined upwardly in a direction away from the door, the escape of smoke will be completely inhibited or larged minimized. Such inclined surface is accordingly employed as shown at 31.

Within the fire box, the fuel and fire is preferably carried in a removable container and grate 32 having handles 33 by which it may be inserted and removed as desired, the fire, coals and the like being retained therein as shown at 34.

As a matter of convenience the exterior of the fire box adjacent the upper surface thereof may be provided along the sides with loops or sockets 35 so spaced as to receive legs or stakes 36 providing supports for a work table top 37. This is of course an optional feature of convenience.

Turning now to the oven or cooking zone portion of the apparatus, this is shown as comprising a bottom wall 38, end walls 39 and 40, and side walls 41 and 42, all joined together so as to make an open top box of a size to just fit within the upstanding rim or between the legs of the support previously described. The interiors of this bottom and the side and end walls are substantially filled with insulation in the hollow space provided by the metal or similar linings in substantially the same fashion as the walls and bottom of the fire box except that in the case of the oven no refractory material is necessary.

The bottom of the oven is preferably provided with a drain opening 44 adapted to be closed by a plug 45 in a substantially conventional manner.

Interconnecting the fire box and the oven are one or more ducts or openings 46 extending through the refractory lining of the fire box and the insulated end wall 40 of the oven so that gases from the burning of fuel in the fire box may pass therethrough into the oven to provide the cooking heat therein. The opposite end of the oven, the end wall 39, is provided with an opening adapted to receive a connection 47 through which exhaust gases or flue gases may pass out of the oven.

The top of the oven is provided with a cover 48 of substantially the same construction as the main body of the oven in that it is in the instance shown provided with a sheet metal shell whose hollow is filled with insulating material. This top 48 is provided with a handle 49 on its front side by which it may be readily lifted away from the body of the oven and is preferably hinged to the oven at its opposite side as shown at 50 although other means of positioning it may be employed if desired. In order to minimize the escape of hot gases from the oven and thus prevent loss of heat as well as disturbing fumes in the vicinity of the apparatus, the upper edges of the walls of the oven and the lower edges of the cover 48 are provided with interengaging rabbeted contour as shown in 51.

For the purpose of appropriately distributing the hot gases from the fire box as they emerge into the oven, there is provided in accordance with this invention a deflector vane 52, preferably mounted at 53 on a bracket 54 on the end wall 40 so that it covers substantially the entire width of such end wall, as shown in FIG. 4, and is movable from the position as shown in FIG. 3 in which a flange along its upper edge engages the end wall 40 and thus prevents the hot gases from flowing upwardly as they emerge from the openings 46 and causing them all to flow downwardly and into the lower portion of the oven, to a position in which the spacer 56 engages the end wall 40, in which most of the gases emerging from the openings 46 would flow upwardly into the upper portion of the oven with only a small portion thereof flowing downwardly through the space provided by the spacer 56. A handle or other member 57 may be provided adjacent the upper portion of this vane for use in moving it to a position desired. It will be appreciated that this vane may be adjusted to any intermediate position which will appropriately distribute the hot gases entering the oven into the upper and lower portions thereof.

In the upper portion of the fitting 47 through which the exhaust gases escape from the oven, there may be provided a damper 58 through which can be regulated the velocity of flow of such exhaust gases. By this means, the flow of such gases through the oven can be retarded in such fashion as to give the food products being cooked therein a greater smoke flavor if so desired. Preferably, the upper end of the fitting 47 is provided with a suitable flue 59 so as to carry the exhaust gases upwardly to a level where they will not be a nuisance to the persons around the apparatus.

Within the oven there are provided suitable grates 60 and 61 carried on a suitable kind of support such as brackets 62 and 63, secured to the interiors of the side walls of the oven. These grates may be each made in two or more sections as illustrated so that either two sections may be employed as shown in the lower portion of the oven or one section as shown in the upper portion, or either upper or lower may be employed separately from the other.

The temperature sensitive element of the thermostat to be employed is located in accordance with this invention adjacent the uppermost cooking level, as shown at 64, but between the two cooking levels. By this means it will sense the temperature adjacent one of the cooking levels but between them, and it has been found that this provides the most desirable temperature throughout the oven with a fairly high degree of sensitivity of control to the temperature desired. This positive control is greatly assisted by placing a portion of this temperature sensitive element in surrounding relationship to the port leading to the exhaust fitting 47, as shown at 65, so that the temperature sensitive element is affected not only by the temperature within the body of the oven but also by the temperature of the gases flowing therefrom. This composite effect on the temperature sensitive element is conveyed in well known fashion to a thermostat switch 66 of conventional construction having an adjustable feature 67 incorporated therein.

Power for actuating the solenoid control for the combustion air intake valve 21 is supplied from the thermostat 66 through suitable wiring 68 to solenoid 23. It is supplied to the thermostat 66 by means of suitable wiring 69 which may in turn be passed through a timing mechanism 70 after being supplied to the timing mechanism through a suitable wiring connection 71. The timer 70 may likewise be of conventional form and preferably is so arranged that it can be set to trigger the supply of combustion air to turn it on and off at predetermined times and intervals subject to the overcontrol of the thermostat 66. It will readily be observed that in the event the current supply fails through the wire 71 for any reason, or in the event the current is cut off by the operation of the timing mechanism 70 or by the thermostat 66, the solenoid 23 will be de-energized causing the closing of the valve 21 and the shutting off of combustion air. So long as this current to the solenoid 23 is controlled solely by the thermostat 66, combustion air will be supplied or shut off at such times and intervals as to maintain the temperature within the oven at that which is desired and for which the thermostat control 67 is adjusted. It is well known that certain types of fuel, once ignited, may retain a fire fairly dormant for considerable periods of time when the combustion air is shut off. When the fire is so started, the timing mechanism 70 may, if desired, be set so as to turn on combustion air at some predetermined time whereupon the temperature within the oven would be raised by the burning of the fuel in the fire box until it reaches the desired level and then maintained at such level until such time as it might be manually turned off or turned off by actuation of the timer 70. By setting of the thermostat 66 and the timer 70, the length of time of cooking can be predetermined and a perfect cooking job produced even by inexperienced operators.

In the use of the device, a minimum of loss of heat will be experienced, resulting in increased comfort for those about and operating the apparatus as well as greatly faciiltating the maintenance of uniform temperature within and throughout the oven, and conservation of fuel so that long periods such as frequently required in barbeque operations may be carried out without necessity for disturbing the fuel supply in the fire box. The distribution of heat within the oven can be very accurately controlled so as to cook food on the upper grate or the lower grate more or less rapidly as desired and maintain the desired temperature in each place although not necessarily the same temperature. The director vane 52 makes this possible.

Finally, it will be observed that inasmuch as the fire box is mounted on the end wall of the oven, in such position as is high enough not to interfere with the upstanding rim of the support, the oven may fit within this rim as illustrated clearly in FIGS. 1 and 3 without any interference from the fire box. Furthermore, since the fire box is made narrow enough so that it will fit between the end legs of a pair of end legs 1a of the support, the support may be telescoped over the oven without interference from the fire box.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

In a cooking apparatus, a fire box and an oven having a hot gas flow passageway interconnecting their interiors, support means in said oven for supporting an object to be cooked and providing an uppermost cooking level, said fire box having an air supply port therein remote from said passageway and said oven having a flue port therein remote from said passageway, a thermostatically controlled damper in said air supply port and a thermostat connected to said damper to control the same and having a temperature sensitive element with two parts, one adjacent said flue port so as to be affected by the temperature of the gas leaving said oven and the other part in said oven remote from said port and said passageway, whereby the admission of air to support combustion in the fire box may be limited to those periods of time when the average temperature in said oven adjacent said flue port and remote from said flue port is below a predetermined minimum.

References Cited by the Examiner

UNITED STATES PATENTS

| | | | |
|---|---|---|---|
| 125,377 | 4/72 | Burke | 126—21 |
| 253,193 | 2/82 | Felton | 110—86 |
| 320,801 | 6/85 | Knight et al. | 126—273 |
| 425,821 | 4/90 | Nogar | 110—88 |
| 804,943 | 11/05 | Fulton | 236—15 |
| 863,657 | 8/07 | Savage | 110—88 |
| 911,550 | 2/09 | Bradburn | 110—1 |
| 1,035,036 | 8/12 | Ogburn | 126—275 |
| 1,064,614 | 6/13 | Cole | 126—21 |
| 1,536,689 | 5/25 | Pierce | 236—15 |
| 2,485,667 | 10/49 | Sims | 126—9 |
| 2,559,710 | 7/51 | Danielsen | 126—9 |
| 2,790,380 | 4/57 | Shryack. | |
| 2,867,208 | 1/59 | True | 126—25 X |
| 2,902,026 | 9/59 | Hathorn | 126—25 |
| 3,041,959 | 7/62 | Oyler | 99—339 X |

FOREIGN PATENTS

| | | |
|---|---|---|
| 494,781 | 11/38 | Great Britain. |
| 106,393 | 1/43 | Sweden. |

JAMES W. WESTHAVER, *Primary Examiner.*

FREDERICK L. MATTESON, Jr., PERCY L. PATRICK, *Examiners.*